Nov. 21, 1967     K. H. GUTNER     3,353,781
MIRROR BRACKET
Filed July 5, 1966
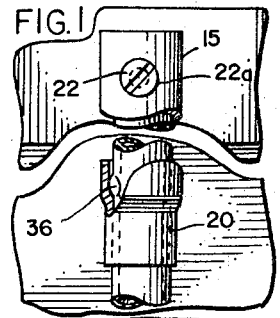
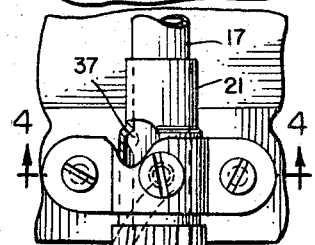
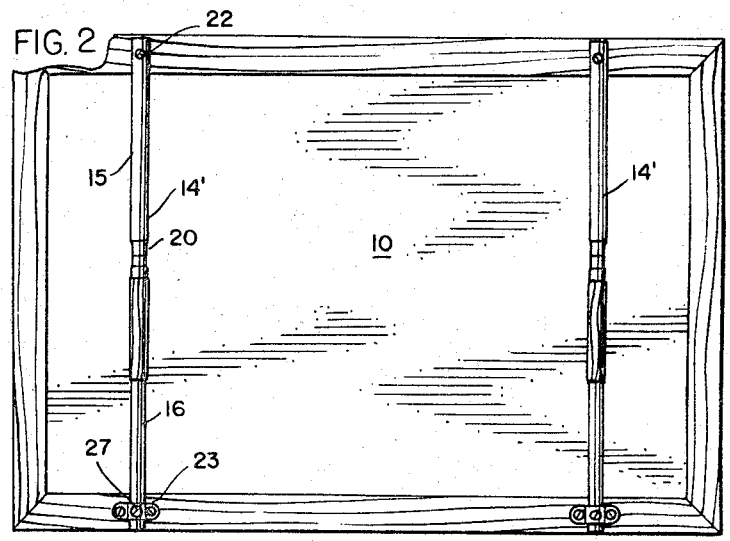
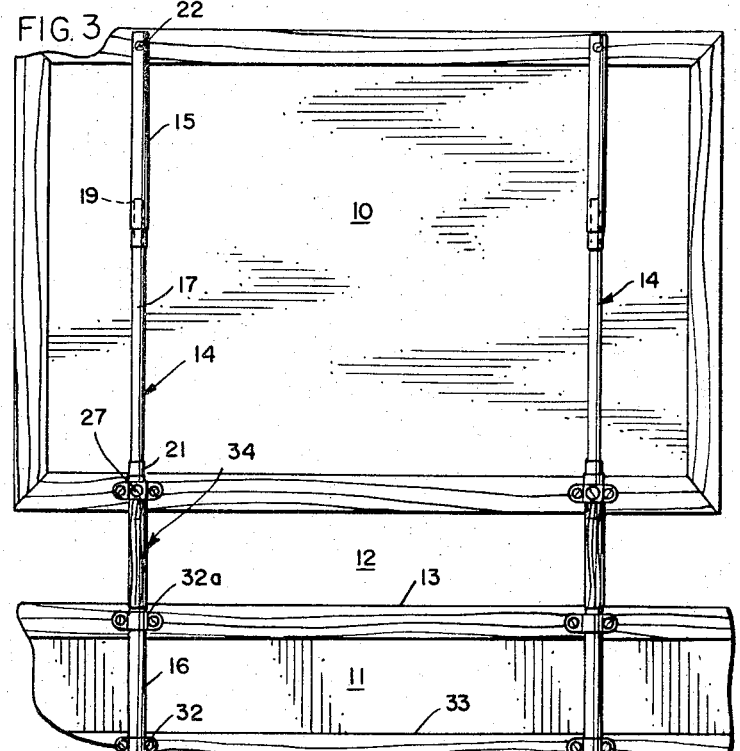
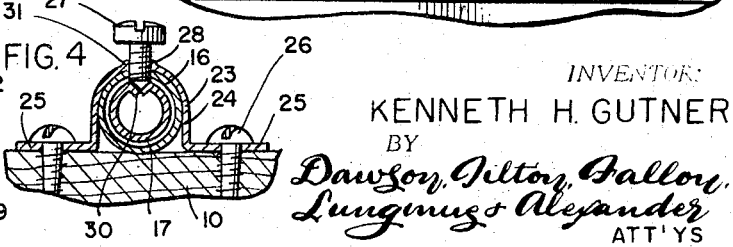
INVENTOR:
KENNETH H. GUTNER
BY
Dawson, Tilton, Fallon,
Lungmus & Alexander
ATT'YS

3,353,781
MIRROR BRACKET
Kenneth H. Gutner, 591 Roger Williams,
Highland Park, Ill. 60035
Filed July 5, 1966, Ser. No. 562,651
1 Claim. (Cl. 248—476)

A mirror bracket for supporting a mirror above a dresser or the like which in a first condition is adapted to be partially telescoped and installed on and within the height of the mirror for shipment and thereafter extended to a second condition with the lower end of the bracket projecting below the mirror for attachment to a dresser.

The problem that has existed in the furniture art has been the loss or misplacement of connecting members. This is particularly true of relatively heavy and long members such as mirror brackets. A mirror bracket is intended to support a mirror above a dresser and when installed may be as long as about four feet. This presents difficulties at the outset insofar as shipping is concerned. In many cases, the brackets are merely taped to the underside of the dresser. This means that they can become detached. Very often the bracket from one dresser is used for another by the retailer and ultimately the problem must be faced of obtaining an additional mirror bracket. Shipping these items loose in the drawers of the dresser could mean damage or loss.

An object of the invention is to provide a mirror bracket which can be installed in place on the back of a mirror for ready shipment and with a minimum amount of handling and manipulation, and ultimately be converted to a condition where it is readily attachable to the rear of a dresser.

Other objects and advantages of the invention may be seen in the details in construction and operation set down in this specification.

The invention is described in conjunction with an illustrated embodiment in the accompanying drawing, in which—

FIG. 1 is a fragmentary elevational view of a bracket installed on a dresser with the mirror also attached;

FIG. 2 is a fragmentary reduced scale view of a mirror showing the inventive brackets attached thereto and the condition they assume during shipment;

FIG. 3 is a fragmentary elevational view of the mirror brackets and mirror of FIG. 2 extended and installed on a dresser, thereby corresponding essentially to the showing of FIG. 1; and FIG. 4 is a fragmentary sectional view taken along the sight line 4—4 applied to FIG. 1.

In the illustration given and with particular reference to FIG. 3, the numeral 10 designates the mirror while the numeral 11 designates the dresser. The mirror is seemed to be supported a spaced distance 12 above the dresser top 13, and by means of brackets generally designated 14. Here it will be appreciated that the brackets 14 are identical.

The brackets 14 are initially provided in the condition designated 14' in FIG. 2 where the brackets are essentially retracted so as to fit within the height of the mirror 10 to facilitate shipment.

Each mirror bracket 14 includes a pair of outer members 1X and 16 (designated the upper and lower outer members in FIG. 3) and an inner member designated 17. The outer members are slidably mounted on the inner member 14 in coaxial relation.

The inner member 17 is radially outwardly flared at each end as at 18 (see FIG. 1) and as at 19 (see FIG. 3) which constitute part of an interengaging means on the three members to prevent complete disassembly of the member. It will be seen that the upper member 15 is equipped with a reduced diameter section at its lower end as at 20 (see particularly FIG. 1) and that the lower member 16 is equipped with a necked-down or reduced diameter portion at its upper end as at 21—the reduced diameter portions 20 and 21 cooperating with the flared portions 19 and 18, respectively, to provide the interengaging means.

In the operation of the bracket 14, it is initially disposed in the condition 14' seen in FIG. 2. For that purpose the upper end of the upper member 15 is secured to the upper framing of the mirror as by a screw 22. For this, the upper end of the upper member 15 is equipped with aligned openings as at 22a (designated only in FIG. 1). This is a permanent installation, i.e., the screw 22 is not removed except for dismantling the bracket 14 from the mirror 10. In other words, when converting the brackets from the condition of FIG. 2 to that of FIG. 3, it is unnecessary to remove the screw 22.

In the condition of the bracket 14 seen in FIG. 2, the lower end of the lower bracket 16 is temporarily fixed to the mirror by means of a clamp 23. The clamp 23 can be seen in FIG. 4 and includes a U-shaped central part 24 integral with sidewardly extending wings 25. The bracket 23 is permanently secured in place by means of wood screws or like fastening means 26 extending into the framework of the mirror 10.

It will be noted that the clamp 23 is equipped with a setscrew 27 which passes through an opening 28 in the portion 24 and openings in the lower outer member 16 and inner member 17. In the condition seen in FIG. 2, the screw 27 passes through an opening at 29 in the lower end of the lower member 16 (see the extreme bottom portion of FIG. 1). The screw 27 also enters an opening 30 provided in the lower end of the inner member 17, when the bracket 14 is in the configuration seen in FIG. 2.

When the bracket 14 is converted to the showing in FIG. 3, the setscrew 27 still engages the opening 30 in the inner member 17 but now passes through an opening 31 provided at the *upper* end of the lower member 16. This is the configuration pictured in FIG. 1 and from which the sectional view of FIG. 4 has been taken.

The openings 29 and 31 are longitudinally aligned in the illustration given, although this is not essential where a screw-less type clamp such as that seen at 32 is employed for securing the lower end of the mirror bracket at the first parting rail 33 thereof. A similar clamp 32a is installed on the upper back of the dresser 11, for insuring double support for the lower member 16.

In the operation of the device, the mirror 10 is provided as shown in FIG. 2. The setscrews 27 and the permanent screws 22 maintain the bracket assembly telescoped as shown for shipment, yet ready for immediate installation. At the site of installation, the mirror is shimmed or supported above the top 13 of the dresser 11 (providing space 12). Thereafter the setscrews 27 are unscrewed and the lower member 16 is moved downwardly relative to the rest of the assembly into the position shown in FIG. 3. At that time, the portion of the bracket 14 visible to view the front, is that generally designated 34. Inasmuch as I prefer to make the bracket out of ½" or ¾" steel tubing, this might be unsightly for some mirror-dresser installations and therefore I color the section 34 in a manner compatible with the framing of the mirror and the dresser. The manner of coloring illustrated is to apply a sheet 35 (see FIG. 1) of plastic film colored to simulate wood and equipped with an adhesive for easy application. Other appliques or colorations may be employed in the section of the lower member 16 visible to view when the mirror 10 is supported above the top 13 of the dresser 11.

Continuing with the installation, the lower portions of the lower member 16 are fixed to the parting rail 33 by means of the lower clamps 32 and the upper clamps 32a are likewise installed. The setscrew 27 is threaded inwardly to engage the inner and outer members in the fashion seen in FIG. 4, thereby developing an installation wherein the three members are fixed relative to each other.

It will be appreciated that merely by loosening clamps 32 and 32 a that the position of the mirror relative to the dresser can be readily changed.

To avoid the possibility of any undesirable wobble in facilitating the ready ensleevement and partial disensleevement of the members relative to each other, I provide the inner member 16 with outwardly extending projections as at 36 and 37 to engage the radially contracted sections 20 and 21 in the fashion seen in FIG. 1.

While in the foregoing specification, a detailed description of an embodiment of the invention has been set down for the purpose of explanation, many variations in the details herein given may be made by those skilled in the art without departing from the spirit and scope of the invention.

I claim:

A mirror bracket for supporting a mirror above a dresser or the like which in a first condition is adapted to be partially telescoped and installed on and within the height of the mirror for shipment and thereafter extended to a second condition with the lower end of the bracket projecting below the mirror for attachment to a dresser, said bracket comprising a pair of outer tubular members in sleeves on an inner tubular member in coaxial relation, enter engaging means on said inner and outer layers preventing disassembly of said outer members from said inner member but permitting slideable movement of said outer members relative to said inner member, said inner engaging means including a constriction on each outer member and flared parts on said inner member, one of said outer members constituting a lower securing member when said bracket is disposed generally vertically and equipped with an opening adjacent each end thereof, an opening in said inner member adapted to be selectively aligned with said lower member opening to fix said bracket in place on a mirror back for shipment when said inner member opening is aligned with the lowermost of said lower member openings and to support a mirror above a dresser when said inner member opening is aligned with the uppermost of said lower member openings, said upper member being equipped with aligned openings adjacent its upper and for the receipt of a screw for permanent affixing of said upper member to the rear top of a dresser.

References Cited

UNITED STATES PATENTS

| 2,600,578 | 6/1952 | Royer | 248—477 |
| 2,745,114 | 5/1956 | Cote | 5—82 |
| 2,893,666 | 7/1959 | Cousins | 248—476 |
| 2,897,911 | 8/1959 | Bowers | 211—123 X |
| 2,910,803 | 11/1959 | Close | 248—345.1 |
| 3,234,897 | 2/1966 | Berk | 108—152 |

FOREIGN PATENTS 740,911  11/1955  Great Britain.

CASMIR A. NUNBERG, *Primary Examiner.*